United States Patent
Seto et al.

(10) Patent No.: US 8,885,843 B2
(45) Date of Patent: Nov. 11, 2014

(54) SOUND GENERATOR

(75) Inventors: Shinji Seto, Hitachinaka (JP); Kenji Hiraku, Kasumigaura (JP); Yousuke Tanabe, West Bloomfield, MI (US); Kenichiro Matsubara, Kasumigaura (JP); Yasushi Takano, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 764 days.

(21) Appl. No.: 13/085,716

(22) Filed: Apr. 13, 2011

(65) Prior Publication Data

US 2011/0255706 A1    Oct. 20, 2011

(30) Foreign Application Priority Data

Apr. 15, 2010 (JP) ................. 2010-093854

(51) Int. Cl.
*A61F 11/06* (2006.01)
*G01H 17/00* (2006.01)
*G10K 15/02* (2006.01)

(52) U.S. Cl.
CPC ............... *G10K 15/02* (2013.01); *G01H 17/00* (2013.01)
USPC ........................................... 381/71.4; 381/86

(58) Field of Classification Search
CPC .. H04R 2499/13; H04R 5/02; G10K 11/1788; G10K 2210/1282
USPC ..................... 381/71.1–71.8, 71.11–71.14, 86
See application file for complete search history.

(56) References Cited

U.S. PATENT DOCUMENTS

| | | | | |
|---|---|---|---|---|
| 5,850,458 A | * | 12/1998 | Tomisawa et al. | 381/71.4 |
| 7,873,173 B2 | * | 1/2011 | Inoue et al. | 381/71.4 |
| 2012/0201397 A1 | * | 8/2012 | Pan et al. | 381/71.4 |

FOREIGN PATENT DOCUMENTS

JP    2007-258980 A    10/2007

* cited by examiner

*Primary Examiner* — Lun-See Lao
(74) *Attorney, Agent, or Firm* — Crowell & Moring LLP

(57) ABSTRACT

A sound generator is provided capable of generating vehicle sound that will be produced when a specific sound element is changed out of a plurality of sound elements arising from the operation of a plurality of components mounted on a vehicle. A sound generator 1 includes: existent sound acquisition means 2 that acquires sound pressure data of vehicle sound produced from a vehicle; existent component-based sound calculation means 4 that calculates existent component-based sound caused by an existent component out of the vehicle sound; existent component-based sound cancel means 3 that calculates existent component canceled sound obtained by canceling the existent component-based sound from the vehicle sound; new component-based sound calculation means 5 that calculates new component-based sound caused by changing of the existent component-based sound; synthesized sound generation means 6 that synthesizes the existent component canceled sound and the new component-based sound to generate a sound pressure waveform of synthesized vehicle sound; and synthesized sound production means 7 that produces sound based on the sound pressure waveform of the synthesized vehicle sound.

11 Claims, 4 Drawing Sheets

| RPM min⁻¹ | 1st amplitude | 1st phase | 2nd amplitude | 2nd phase | ... |
|---|---|---|---|---|---|
| 800 | 0.0366 | ... | ... | ... | |
| 820 | 0.0196 | | | | |
| 840 | 0.0163 | ⋮ | ⋱ | | |
| ⋮ | ⋮ | | | | |

| Accelerator opening condition 2 | | | | | |
| Accelerator opening condition 1 | | | | | |
| RPM min⁻¹ | 1st amplitude | 1st phase | 2nd amplitude | 2nd phase | ... |
|---|---|---|---|---|---|
| | 0.0366 | ... | ... | ... | |
| 820 | 0.0196 | | | | |
| 840 | 0.0163 | ⋮ | ⋱ | | |
| ⋮ | ⋮ | | | | |

SOUND GENERATOR

BACKGROUND OF THE INVENTION

1. Field of the Invention

The present invention relates to sound generators that generate vehicle sound produced from the operation of components mounted on a vehicle.

2. Background Art

Conventionally, a method of generating vehicle sound that will be produced from the operation of components mounted on a vehicle is available. In the case of an engine as a component, for example, waveform data of single sound is prepared as waveform data of each element constituting single sound such as intake sound, engine explosion sound or exhaust sound, and then a frequency change, time and a fluctuation of amplitude are added to the waveform data of the elements selected in accordance with a design condition of the engine, followed by synthesis and output, whereby engine sound is simulated (see Patent Document 1: JP Patent Publication (Kokai) No. 2007-258980 A).

SUMMARY OF THE INVENTION

In the above conventional method, however, sound arising from a component other than the engine or sound arising from a plurality of components cannot be generated. Therefore, when a component other than an engine is replaced with a new component, they cannot listen to sound that will be caused by the new component until the new component is actually manufactured and installed in a vehicle.

In view of the aforementioned problem of the conventional art, it is an object of the present invention to provide a sound generator capable of generating vehicle sound that will be produced when a specific sound element is changed out of a plurality of sound elements arising from the operation of a plurality of components mounted on a vehicle, thereby determining the propriety of the vehicle sound speedily.

In order to cope with the above-stated problem, a sound generator of the present invention is configured to acquire sound pressure data of vehicle sound produced from the vehicle, calculate existent component-based sound caused by an existent component, calculate existent component canceled sound obtained by canceling the existent component-based sound from the sound pressure data of vehicle sound, calculate new component-based sound caused by a new component, synthesize the existent component canceled sound and the new component-based sound to generate a sound pressure waveform of the synthesized vehicle sound, and produce synthesized vehicle sound based on the sound pressure waveform of the synthesized vehicle sound generated.

Effects of the Invention

In accordance with the invention, synthesized vehicle sound can be generated, which is obtained by synthesizing vehicle sound that will be produced from a vehicle when a specific existent component mounted on the vehicle is replaced with a new component. As a result, vehicle sound can be generated, which will be produced when a specific sound element is changed out of a plurality of sound elements arising from the operation of a plurality of components mounted on a vehicle, for example, and therefore the propriety of the sound can be determined speedily.

DESCRIPTION OF A PREFERRED EMBODIMENT OF THE INVENTION

Referring now to FIG. 1 to FIG. 7, a sound generator according to Embodiment 1 of the present invention is described below.

A sound generator 1 generates vehicle sound that will be produced when a specific sound element is changed out of a plurality of sound elements arising from the operation of a plurality of components. The present embodiment exemplifies a sound generator 1 that generates vehicle interior sound that will be produced when a sound element arising from one of components driven by an engine is changed out of the interior sound of a vehicle.

Figure 1:
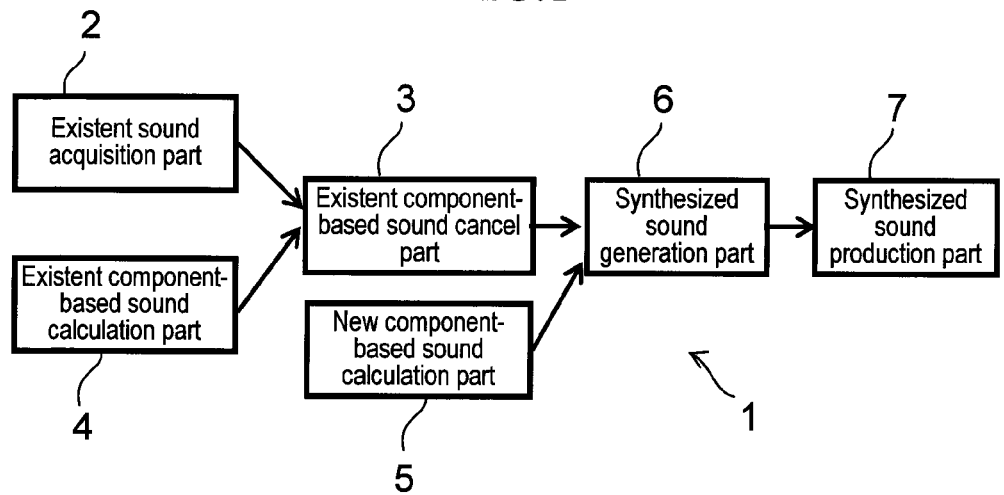
FIG. 1 shows a sound generator according to Embodiment 1 of the present invention.

In FIG. 1, the sound generator 1 includes an existent sound acquisition part 2 as existent sound acquisition means, an existent component-based sound cancel part 3 as existent component-based sound cancel means, an existent component-based sound calculation part 4 as existent component-based sound calculation means, a new component-based sound calculation part 5 as new component-based sound calculation means, a synthesized sound generation part 6 as synthesized sound generation means, and a synthesized sound production part 7 as synthesized sound production means.

To begin with, the existent sound acquisition part 2 is described below.

The existent sound acquisition part 2 performs processing to acquire sound pressure data on interior sound of a vehicle. At this time, the sound pressure data acquired preferably includes data under various conditions. For instance, since the interior sound varies with revolutions per minute (RPM) of an engine, sound pressure data based on the RPM gradually changed may be acquired. Further, sound pressure data based on a change in accelerator opening or in travelling speed is preferably acquired as needed. Moreover, one cycle of engine explosion consists of fuel intake, compression, explosion and exhaust, and the interior sound pressure relates to this timing. Therefore a phase of the cycle (hereinafter referred to as a combustion cycle) where one cycle equals 360° and sound pressure data preferably are measured at the same time.

Next, the existent component-based sound cancel part 3 is described.

A vehicle includes rotary components that are driven by an engine driving force conveyed by a pulley and a chain. An excitation force of such a rotary component propagates through various paths to produce the interior sound.

The existent component-based sound cancel part 3 generates sound pressure data that is obtained by canceling sound arising from one of the rotary components (hereinafter called existent component-based sound) from the sound pressure data obtained by the existent sound acquisition part 2. Hereinafter the data obtained by canceling the existent component-based sound is refereed to as engine sound because the sound mainly arises from the engine.

Figure 2:
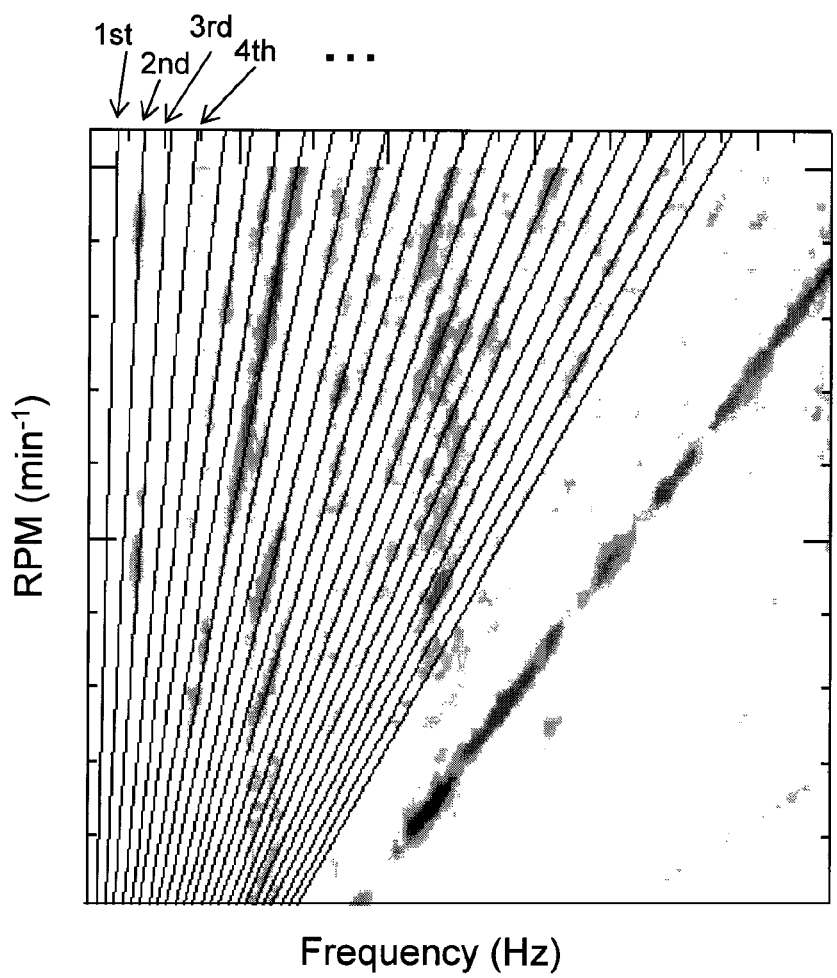
FIG. 2 shows an exemplary Fourier transform result of actually measured sound according to Embodiment 1 of the present invention.

The processing by the existent component-based sound cancel part 3 is as follows. Firstly, sound pressure data obtained by the existent sound acquisition part 2 is subjected to Fourier transform. FIG. 2 shows an exemplary result of the transform. In FIG. 2, the horizontal axis represents frequency, the vertical axis represents RPM and the depth of a color represents sound pressure. A straight line can be obtained by connecting parts with high sound pressures, and it is understood that frequency changes in proportion to RPM in some parts. This shows sound mainly caused by the engine, including the first-order element and its multiple elements (order elements).

Figures 3, 4:
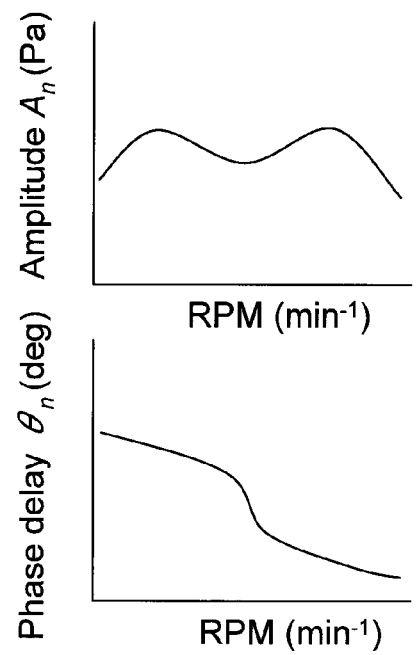
FIG. 3 shows rotation order elements of sound pressure according to Embodiment 1 of the present invention.
FIG. 4 shows exemplary values of rotation order elements of sound pressure according to Embodiment 1 of the present invention.
Figures 5, 6:
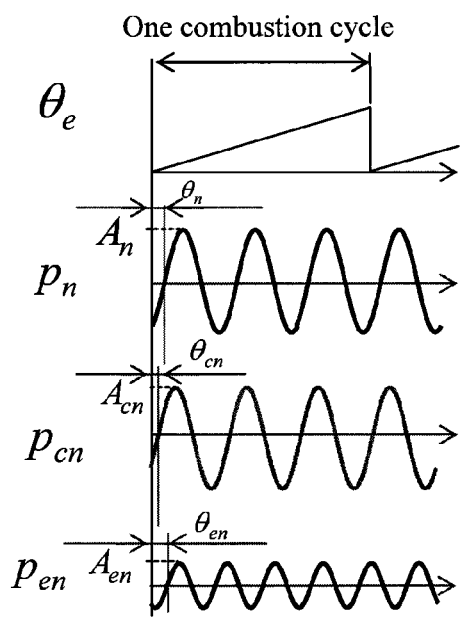
FIG. 5 shows exemplary values of rotation order elements of sound pressure under a plurality of conditions according to Embodiment 1 of the present invention.
FIG. 6 shows an engine sound calculation method according to Embodiment 1 of the present invention.

Paying attention to the interior sound Pn as the n-th order element in the combustion cycle among these order elements, graphs can be obtained as shown in FIG. 3, where the horizontal axis represents RPM and the vertical axes represent amplitude An and phase delay θn. The phase delay indicates a delay from a predetermined position (e.g., at the starting of fuel intake at a piston top dead center) setting as 0° in the combustion cycle (hereinafter this phase delay is referred to as combustion cycle standard phase delay). Relationships between the RPM, the amplitude An and the combustion cycle standard phase delay θn may be stored as data in a format as illustrated in FIG. 4, for example. In the case of another function concerning an accelerator opening, data may be stored hierarchically as illustrated in FIG. 5, for example.

Meanwhile, since the existent component-based sound arises from the rotation of a rotary shaft of an existent component, such sound arises with order elements of the RPM of a component shaft driving the existent component and not with order elements of the combustion cycle.

Then, a combustion cycle order of the existent component-based sound is calculated based on a rotational ratio between a crank shaft and the existent component rotary shaft. For instance, consider a component with the rotational ratio between the crank shaft rotation and the existent component of 4:3 and producing sound at a first-order, a second-order, a third-order, a fourth-order . . . of the existent component RPM. Assuming a four-cycle engine where one combustion cycle takes place within two rotations of the crank shaft, a first-order, a second-order, a third-order and a fourth-order of the existent component RPM where the existent component-based sound arises correspond to a 8/3-th order, a 16/3-th order, an eighth-order and a 32/3-th order, . . . of the combustion cycle order, respectively. On the other hand, engine sound arises at a first-order, a second-order, a third-order . . . of the combustion cycle order.

Accordingly, at the eight-order and the sixteenth-order, the existent component-based sound and the engine sound agree in frequency. Then, the engine sound is found by subtracting the existent component-based sound from the interior sound. An order element Pcn (amplitude Acn, combustion cycle standard phase delay θcn) of the existent component-based sound Pc is calculated for each RPM by the existent component-based sound calculation part 4 described below.

Engine sound Pen can be found based on the interior sound Pn and the existent component-based sound Pcn as in:

[Expression 1]

$$Pen = Pn - Pcn \qquad (1).$$

As illustrated in FIG. 6, since Pn and Pcn contain information on the amplitude (An, Acn) and the combustion cycle standard phase delay (θn, θcn), amplitude Aen and combustion cycle standard phase delay θen can be found for the engine sound Pen as well, which also is saved as in the format of FIG. 4.

Next, the existent component-based sound calculation part 4 is described below.

Figure 7:
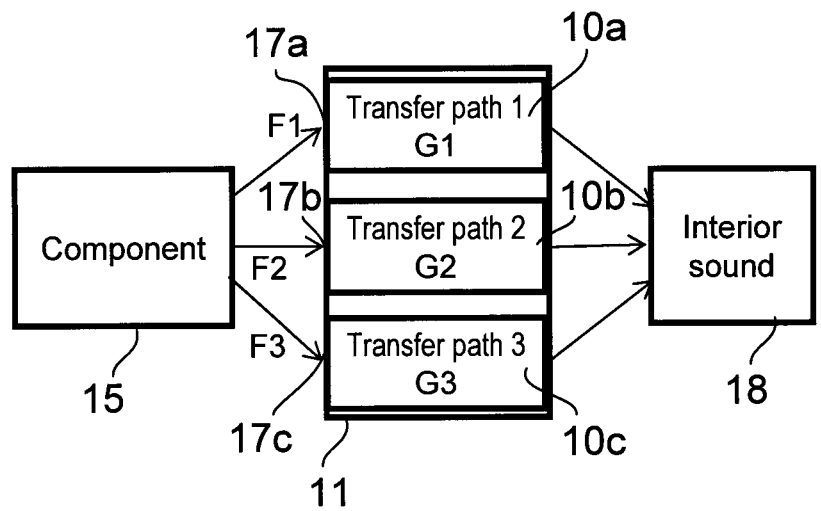
FIG. 7 shows a transfer path of component-based sound according to Embodiment 1 of the present invention.

In general, component-based sound caused by a component is produced by propagation of vibration from the component through a plurality of transfer paths, for example. As illustrated in FIG. 7, in the case where a component 15 is attached to a vehicle body 11 at three points, forces at their attachment points 17a, 17b and 17c propagate through transfer paths 10a, 10b and 10c, respectively, to produce interior sound, which can be found by multiplying the forces F1, F2 and F3 at the attachment positions 17 with transfer functions G1, G2 and G3. In general, interior sound can be found by finding the force Fi and the transfer function Gi for every i.

Thus, in order to find the existent component-based sound, time history data may be measured for the force Fi at the i-th attachment position by sequentially changing the RPM. At the same time, the combustion cycle may be measured as well. Using this data, the force Fi at the i-th attachment position is subjected to Fourier transform for each RPM to extract order elements, whereby a combustion cycle n-th element Fni of Fi can be found. Fni contains information on amplitude and combustion cycle standard phase delay. Therefore the n-th element Pcn of the existent component-based sound Pc can be found by Expression 2.

[Expression 2]

$$P_{cn} = \sum_i (G_i \times F_{ni}) \qquad (2)$$

Since Fni contains information on amplitude and combustion cycle standard phase delay and Gi contains information on gain of output with reference to input and phase delay of output with reference to input, Pcn will contain information on amplitude Acn and combustion cycle standard phase delay θcn.

In the present embodiment, Fi and Gi are measured beforehand. However, they may be found by a method such as a finite element method (FEM).

Next, the new component-based sound calculation part 5 is described below.

New component-based sound is caused by a component, which arises when an existent component mounted on a vehicle is changed into a new component with specifications different from those of the existent component or when a transfer path from a component to interior sound is changed, for example.

The new component-based sound can be found as follows. That is, when a new component is mounted on a vehicle, a force Finew at the i-th attachment position of the new component to the vehicle body is calculated. When a transfer path from an attachment position of the body to interior sound is changed, a transfer function Ginew is calculated from the force at the attachment position of the body to the interior sound.

Since Finew results from the rotation of the rotary shaft of the new component, a m-th order element Fminew of the RPM of the new component rotary shaft is calculated as information on the amplitude and the phase delay. The phase delay herein indicates a delay from a predetermined angle of the new component rotary shaft setting as 0° (hereinafter this phase delay is referred to as component rotary shaft standard phase delay).

Thereby, a m-th element Pcmnew of the RPM of the new component of the new component-based sound Pcnew can be represented by Expression 3:

[Expression 3]

$$P_{cmnew} = \sum_i (G_{inew} \times F_{minew})  \quad (3)$$

Pcmnew also is stored as a function of the amplitude Acmnnew and the component rotary shaft standard phase delay θcmnnew.

The force Fminew occurring at the component attachment position may be calculated as follows. That is, Fminew may be found by a computer, for example, where a force occurring inside a component is set as input, and Fminew is found by FEM, for example, to output a force occurring at the attachment position. Alternatively, a force occurring from a new component may be actually measured.

The transfer function Ginew may be found by measurement or may be found by a computer using FEM, for example.

Next, the synthesized sound generation part 6 is described below.

The synthesized sound generation part 6 generates a synthesized interior sound of engine sound and new component-based sound. Firstly, time history ωcs(t) of an engine RPM to be reproduced is decided, which is then integrated, whereby a time history waveform of a combustion cycle is generated as indicated in Expression 4.

[Expression 4]

$$\theta_e(t) = \frac{1}{2} \int \omega_{cs}(t) dt \quad (4)$$

As a result, a time history waveform Pen(t) of sound pressure as a combustion cycle n-th element arising from the engine sound will be as in Expression 5.

[Expression 5]

$$Pen(t)=Aen(t) \times \mathrm{Sin}(n\theta e(t)-\theta en(t)) \quad (5)$$

In this expression, Aen(t) and θen(t) are created based on the data of the amplitude and combustion cycle phase delay calculated by Expression 1 so as to interpolate data between the RPMs.

Next, sound of each order are summed, so that a time history waveform Pe(t) of sound pressure of engine sound will be as in Expression 6.

[Expression 6]

$$P_e(t) = \sum_n P_{en}(t) \quad (6)$$

Meanwhile, letting that a rotational ratio of the new component rotary shaft to the combustion cycle is k, a time history waveform of an angle of the new component rotary shaft can be found by Expression 7.

[Expression 7]

$$\theta c(t)=k\theta e(t)+\theta 0 \quad (7)$$

wherein θ0 represents an initial angle of the new component rotary shaft with reference to the standard position of the combustion cycle.

The rotational ratio k and the initial phase θ0 may be changed as needed, whereby sound can be easily synthesized when the rotational ratio and the initial angle are changed. Based on this expression, a time history waveform Pcmnew(t) of sound pressure occurring at the m-th order of the new component RPM is generated by Expression 8.

[Expression 8]

$$Pcmnew(t)=Acmnew(t) \times \mathrm{Sin}(m\theta c(t)-\theta cmnew(t)) \quad (8)$$

In this expression, Acmnew(t) represents amplitude, and a value of θcmnew(t) is created to interpolate data between the RPMs based on the value obtained by Expression (3).

Next, as indicated in Expression (9), the time history waveform of sound pressure at each order are summed, whereby a time history waveform Pc(t) of sound pressure of the new component-based sound is found.

[Expression 9]

$$P_c(t) = \sum_m P_{cm}(t) \quad (9)$$

Since a time history waveform P(t) of sound pressure of interior sound is a resultant of synthesizing the time history waveform Pe(t) of sound pressure of engine sound and the time history waveform Pc(t) of sound pressure of component-based sound, the interior sound can be generated by summing them as in Expression (10).

[Expression 10]

$$P(t)=Pe(t)+Pc(t) \quad (10)$$

As for an element that does not depend on the RPM (e.g., wind sound and road sound), interior sound during engine stop is measured under different traveling conditions, which is summed to Expression (10), whereby sound closer to real sound for sound during travelling can be synthesized.

Next, the synthesized sound production part 7 is described below.

The synthesized sound production part 7 converts the thus obtained time history waveform P(t) of sound pressure into electrical signals, and makes a speaker or the like produce sound.

With the above-stated configuration, interior sound that will be produced when a component is changed or when a transfer path from a component to interior sound is changed can be produced through a speaker.

According to the present embodiment, vehicle sound can be generated, which will be produced when a specific sound element is changed out of a plurality of sound elements arising from the operation of a plurality of components mounted on a vehicle, and therefore the propriety of the sound can be determined speedily.

Thus, interior sound can be generated and produced, which will be produced when an existent component mounted on a vehicle is replaced with a new component with specifications different from those of the existent component. Therefore, a component manufacturer who manufactures a new component is allowed to let a vehicle manufacturer as a client listen to interior sound that will be produced when the new component is mounted on a vehicle instead of actual replacement and to let the vehicle manufacturer to evaluate the sound in advance.

The present embodiment describes the generation and production of interior sound. However, sound at another place such as vehicle exterior sound can be generated in a similar manner. Sound arising from a component other than an engine as well can be generated in a similar manner.

Figure 8:
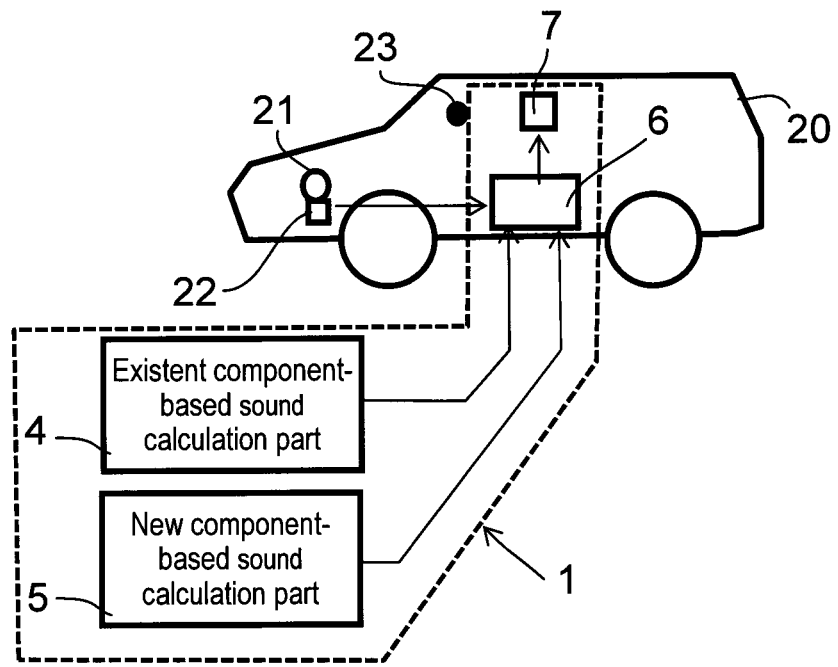
FIG. 8 schematically shows a vehicle mounting a sound generator thereon according to Embodiment 2 of the present invention.

The following describes Embodiment 2 of the present invention, with reference to FIG. 8.

FIG. 8 illustrates a sound generator 1 and a vehicle 20 mounting a part of the sound generator 1 thereon.

The sound generator 1 includes an existent component-based sound calculation part 4, a new component-based sound calculation part 5, a synthesized sound generation part 6, a synthesized sound production part 7, and a component rotary shaft sensor 22. Among them, the vehicle 20 mounts at least the component rotary shaft sensor 22, the synthesized sound generation part 6 and the synthesized sound production part 7 thereon.

The component rotary shaft sensor 22 detects an angle and a rotation speed of a rotary shaft of an existent component 21 that is mounted on the vehicle and is rotary-driven by an engine rotary drive force, which may be configured to calculate one of the angle and the rotation speed from the other.

The existent component-based sound calculation part 4 calculates amplitude Acm of sound pressure and component rotary shaft standard phase delay θ cm at a sound receiving point 23 for each order element of the RPM of a component shaft beforehand. This calculation may be carried out by the method described in Embodiment 1.

Further, considering a transfer function Gr from the synthesized sound production part 7 to the sound receiving point 23, calculation as indicated in Expression 11 is carried out:

[Expression 11]

$$P_{cmo} = G_r^{-1} P_{cm} \tag{11}$$

In this way, preferably amplitude Acm and component rotary shaft standard phase delay θ cm for each RPM are found.

The new component-based sound calculation part 5 calculates amplitude Acmnew and component rotary shaft standard phase delay θcmnew at the sound receiving point 23 for a m-th element of the new component RPM. This calculation may be carried out in the method described in Embodiment 1. Further, considering a transfer function Gr from the synthesized sound production part 7 to the sound receiving point 23, calculation as indicated in Expression 12 preferably is carried out

[Expression 12]

$$P_{cmonew} = G_r^{-1} P_{cmnew} \tag{12}$$

The amplitude Acmnew and the component rotation angle standard θcmnew are found for each RPM.

The synthesized sound generation part 6 generates a time history waveform of component sound by Expression 13 based on the result obtained by the existent component-based sound calculation part, the result obtained by the new component-based sound calculation part and the result obtained by the component rotary shaft sensor 22.

[Expression 13]

$$P_{cmo}(t) = A_{cmo}(t) \times \mathrm{Sin}(m\theta_c(t) - \theta_{cmo}(t)) \tag{13}$$

In this expression, θc is a rotation angle of the rotary shaft that is obtained from the component rotary shaft sensor 22, and the amplitude Acmo(t) and the component rotary shaft standard phase delay θcmo(t) are found by interpolation based on the rotation speed values of the rotary shaft obtained from the component rotary shaft sensor 22 similarly. A time history waveform of sound pressure of the new component-based sound is generated by

[Expression 14]

$$P_{cmonew}(t) = A_{cmonew}(t) \times \mathrm{Sin}(m\theta_c(t) - \theta_{cmonew}(t)) \tag{14}$$

In this expression, θc is a rotation angle of the rotary shaft that is obtained from the component rotary shaft sensor 22, and the amplitude Acmonew(t) and the component rotary shaft standard phase delay θcmonew(t) are found by interpolation based on the rotation speed values of the rotary shaft obtained form the component rotary shaft sensor 22 similarly.

Then, a time history waveform Po(t) of sound pressure to be produced from the synthesized sound production part 7 is synthesized by Expression 15.

[Expression 15]

$$P_o(t) = \sum_m (-P_{cmo} + P_{cmonew}) \tag{15}$$

This time history waveform Po(t) of sound pressure is produced from the sound production part 7. Sound produced based on the first term in Expression 15 is sound with an opposite phase of the existent component-based sound originally arising in the vehicle at the sound receiving point, and therefore will cancel the existent component-based sound. Then sound based on the second term can be heard at the sound receiving point 23 as new component sound. Sound other than component-based sound will be heard directly at the sound receiving point.

According to the present embodiment, interior sound that will be produced when an existent component mounted on a vehicle is replaced or when a transfer path or a transfer function is changed can be heard without actual replacement of the component and without a change in transfer path. Further, as for sound other than the sound from the changed component, actual sound in the vehicle can be directly heard, and therefore sound closer to real sound can be heard.

As stated above, according to the present invention, interior sound can be generated, which will be produced when a specific sound element is changed out of a plurality of sound elements arising from the operation of a plurality of components mounted on a vehicle, and therefore the propriety of the sound can be determined speedily.

Thus, interior sound can be generated and produced, which will be produced when an existent component mounted on a vehicle is replaced with a new component with specifications different from those of the existent component. Therefore, a component manufacturer who manufactures a new component is allowed to let a vehicle manufacturer as a client listen to interior sound that will be produced when the new component is mounted on a vehicle instead of actual replacement and to let the vehicle manufacturer to evaluate the sound in advance.

What is claimed is:

1. A sound generator that generates synthesized vehicle sound that is obtained by synthesizing vehicle sound produced from a vehicle when a specific existent component mounted on the vehicle is replaced with a new component, comprising:

existent sound acquisition means that acquires sound pressure data of vehicle sound produced from the vehicle;

existent component-based sound calculation means that calculates existent component-based sound caused by the existent component;

existent component-based sound cancel means that calculates existent component canceled sound obtained by canceling the existent component-based sound from the sound pressure data of vehicle sound;

new component-based sound calculation means that calculates new component-based sound caused by the new component;

synthesized sound generation means that synthesizes the existent component canceled sound and the new component-based sound to generate a sound pressure waveform of the synthesized vehicle sound; and synthesized sound production means that produces synthesized vehicle sound based on the sound pressure waveform of the synthesized vehicle sound generated by the synthesized sound generation means.

2. The sound generator according to claim 1, wherein the existent sound acquisition means acquires sound pressure data of vehicle sound produced from the vehicle at a plurality of revolutions per minute (RPMs) of a rotary machine, the existent component-based sound calculation means calculates sound pressure data of existent component-based sound caused by a specific component driven by a driving force of the rotary machine out of the vehicle sound with sound pressure order element data for each rotary order element that is a frequency in proportion to the RPM of the rotary machine, the existent component-based sound cancel means converts the sound pressure data of vehicle sound into sound pressure order element data for each rotary order element, and subtracts the sound pressure order element data of existent component-based sound from the sound pressure order element data of the vehicle sound while assigning a same phase standard thereto so as to find sound pressure order element data of existent component canceled sound for each rotary order element.

3. The sound generator according to claim 2, wherein the sound pressure order element data includes amplitude of sound pressure and phase delay with reference to a predetermined position of the rotary machine.

4. The sound generator according to claim 3, wherein the new component-based sound calculation means calculates sound pressure data of new component-based sound caused by a component due to rotation of a rotary shaft of the component by a rotary driving force of the rotary machine with sound pressure order element data for each component rotary order element that is a frequency in proportion to a RPM of the rotary shaft of the component, and the synthesized sound generation means receives the RPM of the rotary machine as input to generate a sound pressure waveform of the existent component canceled sound based on the sound pressure order element data of the existent component canceled sound, generates a RPM of the component rotary shaft from the RPM of the rotary machine, generates a sound pressure waveform of the new component-based sound from the sound pressure order element data of the new component-based sound, and generates a sound pressure waveform of synthesized sound by summing the sound pressure waveform of the existent component canceled sound and the sound pressure waveform of the new component-based sound.

5. The sound generator according to claim 4, wherein the sound pressure order element data of the new component-based sound includes amplitude and phase delay with reference to a predetermined position of the component rotary shaft, and the synthesized sound generation means generates a sound pressure waveform of the new component-based sound based on the sound pressure order element data of the new component-based sound so that an initial position of the component rotary shaft is changed at any position, and generates a sound pressure waveform of synthesized sound by summing the sound pressure waveform of the existent component canceled sound and the sound pressure waveform of the new component-based sound.

6. The sound generator according to claim 1, wherein the existent sound acquisition means acquires vehicle sound during driving of a rotary machine and a vehicle interior sound during stopping of the rotary machine and travelling of the vehicle, and the synthesized sound generation means synthesizes the existent component canceled sound, the new component-based sound and the vehicle interior sound during stopping of the rotary machine to generate a sound pressure waveform of the synthesized vehicle sound.

7. A sound generator, comprising: existent component-based sound calculation means; new component-based sound calculation means; synthesized sound generation means; synthesized sound production means; component rotation angle measurement means; and component rotation speed measurement means, wherein the component rotation angle measurement means and the component rotation speed measurement means measure a rotation angle and a rotation speed of a specific component mounted on a vehicle, respectively, the existent component-based sound calculation means calculates sound pressure data of existent component-based sound caused by a specific component driven by a driving force of a rotary machine with sound pressure order element data for each rotary order element that is a frequency in proportion to a RPM of the rotary machine, the new component-based sound calculation means calculates sound pressure data of new component-based sound caused by a component due to rotation of a rotary shaft of the component by a rotary driving force of the rotary machine with sound pressure order element data for each component rotary order element that is a frequency in proportion to a RPM of the rotary shaft of the component, the synthesized sound generation means generates a sound pressure waveform with an opposite phase to a phase of existent component-based sound based on the rotation angle and the rotation speed of the component rotary shaft of the specific component obtained by the component rotation angle measurement means and the component rotation speed measurement means, generates a sound pressure waveform of the new component-based sound based on the sound pressure order element data of the new component-based sound so that an initial position of the component rotary shaft is changed at any position, and generates a sound pressure waveform of synthesized sound by summing the sound pressure waveform with an opposite phase to a phase of the existent component-based sound and the sound pressure waveform of the new component-based sound, and the synthesized sound production means produces sound based on the sound pressure waveform of the synthesized sound.

8. The sound generator according to claim 1, wherein the existent component-based sound or the new component-based sound is caused by an excitation force occurring at a component propagating through a plurality of transfer paths to reach a sound receiving point, the existent component-based sound calculation means or the new component-based sound calculation means multiplies an input to the transfer paths with a transfer function of the transfer paths to calculate the existent component-based sound or the new component-based sound, and finds the input to the transfer paths and the transfer function by measurement.

9. The sound generator according to claim 1, wherein the existent component-based sound calculation means or the new component-based sound calculation means calculates at least one of the input to the transfer paths and the transfer function of the transfer paths using a computer.

10. The sound generator according to claim 7, wherein the existent component-based sound or the new component-based sound is caused by an excitation force occurring at a component propagating through a plurality of transfer paths to reach a sound receiving point, the existent component-based sound calculation means or the new component-based sound calculation means multiplies an input to the transfer paths with a transfer function of the transfer paths to calculate the existent component-based sound or the new component-based sound, and finds the input to the transfer paths and the transfer function by measurement.

11. The sound generator according to claim 7, wherein the existent component-based sound calculation means or the new component-based sound calculation means calculates at least one of the input to the transfer paths and the transfer function of the transfer paths using a computer.

* * * * *